(12) United States Patent
Niemann

(10) Patent No.: US 7,868,692 B1
(45) Date of Patent: Jan. 11, 2011

(54) LOW NOISE AND COMMON MODE CURRENT POWER SUPPLY

(75) Inventor: James A. Niemann, Aurora, OH (US)

(73) Assignee: Keithley Instruments, Inc., Cleveland, OH (US)

( * ) Notice: Subject to any disclaimer, the term of this patent is extended or adjusted under 35 U.S.C. 154(b) by 323 days.

(21) Appl. No.: 12/124,392

(22) Filed: May 21, 2008

(51) Int. Cl.
*H03F 1/04* (2006.01)
*H03F 1/34* (2006.01)

(52) U.S. Cl. .................. 330/10; 330/207 A; 330/251; 330/297; 327/125; 327/562

(58) Field of Classification Search .................. 330/10, 330/207 A, 251, 297; 327/125, 562
See application file for complete search history.

(56) References Cited

U.S. PATENT DOCUMENTS

| | | | | |
|---|---|---|---|---|
| 3,976,932 A | * | 8/1976 | Collins | 363/132 |
| 4,554,512 A | * | 11/1985 | Aiello | 330/10 |
| 5,345,198 A | * | 9/1994 | Jacobson | 332/152 |
| 5,736,906 A | * | 4/1998 | Jacobson | 332/152 |
| 5,949,296 A | * | 9/1999 | Jacobson | 332/152 |
| 2002/0125941 A1 | * | 9/2002 | Nguyen | 330/10 |
| 2002/0140317 A1 | * | 10/2002 | Knowles et al. | 310/318 |

* cited by examiner

*Primary Examiner*—Bao Q Vu
(74) *Attorney, Agent, or Firm*—Pearne & Gordon LLP

(57) ABSTRACT

A power supply includes: a switching amplifier including an input and an output, the amplifier input being adapted to be powered by an electrical power source; a transformer including a primary and a secondary winding on a magnetic core, the number of winding turns being chosen to limit magnetization levels to avoid magnetic saturation while maximizing winding spacing, the transformer primary winding being in communication with the amplifier output; a rectification system in communication with the transformer secondary winding, the rectification system providing a DC power output; and a controller. The controller monitors the DC power output and adjusts the switching amplifier in response to the monitoring to provide a desired power output characteristic.

9 Claims, 2 Drawing Sheets

LOW NOISE AND COMMON MODE CURRENT POWER SUPPLY

BACKGROUND OF THE INVENTION

The present invention relates to electrical power supplies and, in particular, to supplies having low noise and common mode current.

In many applications requiring low noise and low common mode current, large, heavy and expensive linear power supplies are used. A typical main component of these supplies are large, heavy and expensive transformers working at power main frequencies (e.g., low multiples of 60 hertz) that are specially designed for low noise and isolation. These transformers typically have large, heavy cores and many-turn (e.g., greater than 100) windings.

Switching power supplies often dispense with such transformers at the expense of additional noise in the DC output and degraded common mode performance. However, these supplies are usually smaller, lighter and less expensive.

SUMMARY OF THE INVENTION

A power supply includes: a switching amplifier including an input and an output, the amplifier input being adapted to be powered by an electrical power source; a transformer including a primary and a secondary winding on a magnetic core, the number of winding turns being chosen to limit magnetization levels to avoid magnetic saturation while maximizing winding spacing, the transformer primary winding being in communication with the amplifier output; a rectification system in communication with the transformer secondary winding, the rectification system providing a DC power output; and a controller. The controller monitors the DC power output and adjusts the switching amplifier in response to the monitoring to provide a desired power output characteristic.

DESCRIPTION OF THE PREFERRED EMBODIMENT

Figure 1:
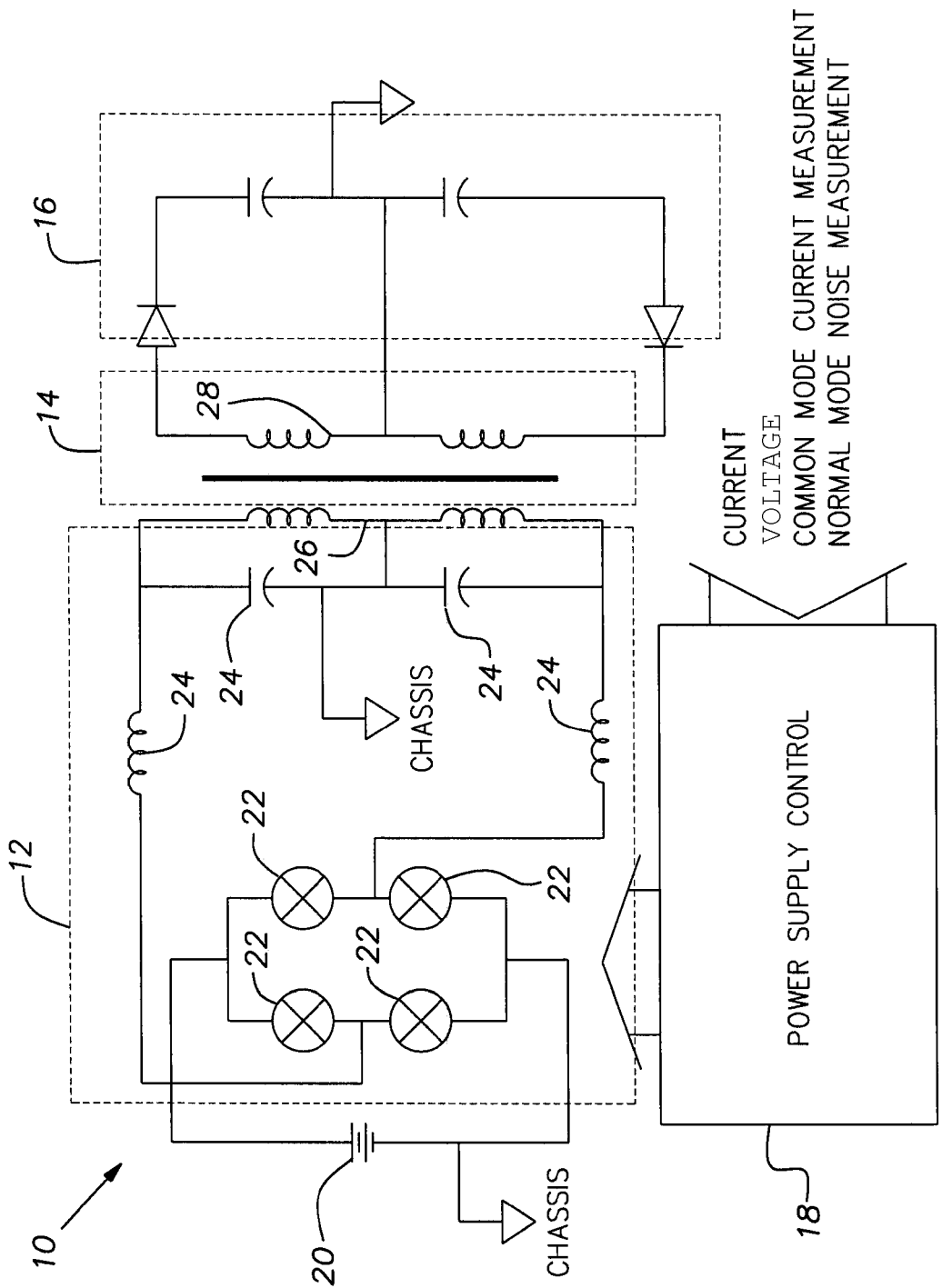
FIG. 1 is a schematic diagram of an example of a power supply according to the invention.

Referring to FIG. 1, a power supply 10 includes a switching amplifier 12, a transformer 14 and a rectifying system 16, all controlled by a controller 18 that monitors the operation of the power supply and controls the amplifier 12 to provide the desired performance.

The power supply 10 is powered by a power source 20, here arbitrarily indicated as a DC battery for simplicity in understanding the invention.

The switching amplifier 12 may, for example, be implemented as a class D amplifier with switching elements 22 and filtering elements 24.

The controller 18 operates the switching elements 22 so that the switching amplifier 12 converts the output of the power source 20 to a sine-like AC voltage for application to the primary winding 26 of the transformer 14. The resulting current in the secondary winding 28 of the transformer 14 is applied to the rectifying system 16 to produce the desired DC output voltage of the power supply 10.

The rectifying system 16 may be, for example, a simple diode/filter capacitor system as illustrated. Improved rectifying performance may be achieved with more complex filtering, or various active rectifying schemes.

The controller 18 can shape the waveform in the switching amplifier 12 to improve the performance of the power supply 10. For example, the output voltage, output current, common mode current level, and normal mode noise level can be monitored by the controller and waveform in the amplifier 12 adjusted to control these parameters. For example, the waveform may be elongated around "zero" (i.e., the slope flattened) to minimize high frequency content. In general, it will be desirable to limit frequency content that would cause "ringing" or "tanking" in both intentional and parasitic reactances. This will reduce both common mode and normal mode noise.

The controller 18 may be implemented, for example, with relatively complex discrete device configuration or in a relatively inexpensive digital signal processor, including all of the voltage and current feedback pathways. Besides controlling the general time behavior of the switching amplifier 12, the controller 18 may be instructed to perform functions such as creating "quiet" periods with no noise for a limited time by temporarily stopping the switching waveform.

In general, the power source 20 may be another DC power supply or even an AC source if, for example, the controller 18 also is configured to monitor the AC values and adjusts the switching elements 22 accordingly.

The switching amplifier 12 is operated, for example, in the range of 2-15 kilohertz. This is high enough to use much smaller magnetics, but low enough to avoid undesired coupling. This allows the transformer 14 to be designed in a manner that greatly improves isolation between the input and the output of the power supply 10. When using the power supply 10 to power precision electrical measurement instruments, very low common mode currents are greatly sought after.

Figure 2:
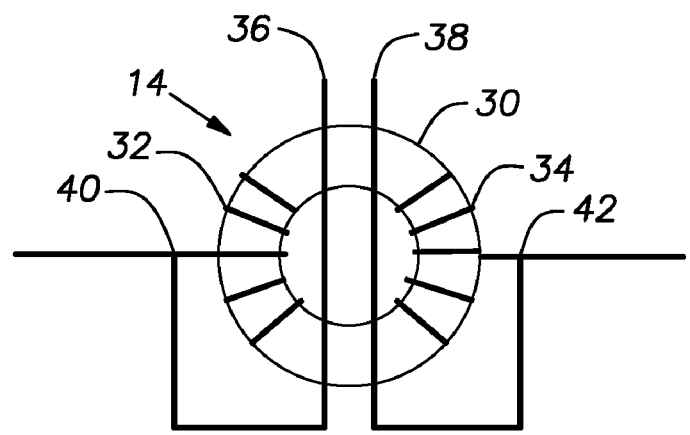
FIG. 2 is a schematic diagram of an example of a transformer for use in the invention.

Referring to FIG. 2, an example transformer 14 uses a toroidal core 30. Primary turn shielding 32 and secondary turn shielding 34 is shown, along with a plate-like (shown perpendicular to the page) primary shield 36 and secondary shield 38. The core 30 effectively pierces the shields 36, 38. In this example, the turn shielding is the shield of a coaxial cable and the actual turn conductors are the center conductors inside of the coaxial cable. In general, fluoropolymers (e.g., PTFE) can be used as an insulating material to minimize DC leakage.

The transformer 14 is used to provide isolation between the input and output of the power supply 10. It is also used for voltage/current transformation. The number of turns is kept intentionally small (e.g., 4-30 total). In general, the number of turns is limited to what is needed to keep the magnetization level at acceptable levels to avoid magnetic saturation of the core. This allows the turns to be widely spaced apart. The wide spacing greatly reduces capacitance from the primary and secondary windings. As a result, common mode current is reduced as well.

The primary and secondary shields 32, 34 are only connected to the center taps 40, 42 of the respective primary and secondary windings. Zero current in the shield means zero interaction with the leakage inductance. Similarly, the shields 36, 38 are also connected to the respective center taps 40, 42, further increasing isolation.

Figure 3:
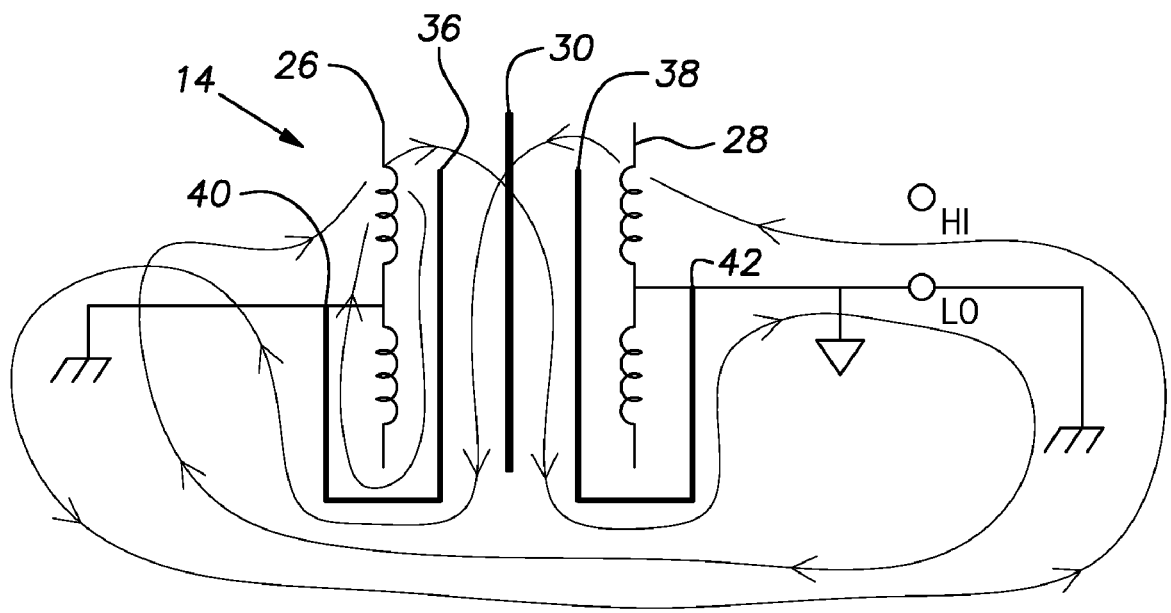
FIG. 3 is a schematic diagram of an example of common mode currents in the transformer of FIG. 2.

Referring to FIG. 3, the common mode current paths in the transformer 14 are shown to help illustrate the effect of the shields in the transformer 14.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A power supply, said power supply comprising:
    a switching amplifier including an input and an output, said amplifier input being adapted to be powered by an electrical power source;
    a transformer including a primary and a secondary winding on a magnetic core, the number of winding turns being chosen to limit magnetization levels to avoid magnetic saturation while maximizing winding spacing, said transformer primary winding being in communication with said amplifier output;
    a rectification system in communication with said transformer secondary winding, said rectification system providing a DC power output; and
    a controller, said controller monitoring said DC power output and adjusting said switching amplifier in response to said monitoring to provide a desired power output characteristic.

2. A power supply according to claim 1, wherein said desired power output characteristic is voltage.

3. A power supply according to claim 1, wherein said desired power output characteristic is current.

4. A power supply according to claim 1, wherein said desired power output characteristic is common mode current.

5. A power supply according to claim 1, wherein said desired power output characteristic is normal mode noise.

6. A power supply according to claim 1, wherein said transformer operates at a frequency between 2 and 15 kilohertz.

7. A power supply according to claim 1, wherein said transformer windings include electrostatic shielding between the primary and secondary windings.

8. A power supply according to claim 7, wherein said primary and secondary windings are each formed from coaxial cable having an outer shield connected only to a respective primary and secondary winding center tap.

9. A power supply according to claim 8, further comprising a primary and a secondary conductive shield interposed between said primary and secondary windings, each conductive shield being connected to the respective primary and secondary winding center tap.

* * * * *